United States Patent Office

2,842,547
Patented July 8, 1958

2,842,547

PROCESS FOR PREPARING 5,5' DIETHYL-1,3-BIS-(BETA - DIMETHYLAMINOETHYL) - MALONYL UREAS AND QUATERNARY AMMONIUM SALTS THEREOF

Walter Chiti and Renato Selleri, Florence, Italy, assignors to "Ibis" Istituto Biochimico Sperimentale S. p. A., Florence, Italy, an Italian company No Drawing. Application April 27, 1956
Serial No. 580,977

Claims priority, application Italy May 3, 1955

4 Claims. (Cl. 260—256.4)

The present invention relates to compounds which correspond to the formula

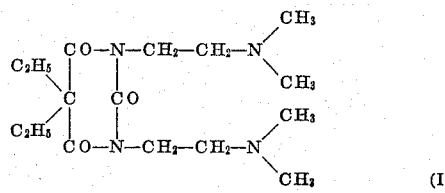

and to two quaternary ammonium derivatives thereof:

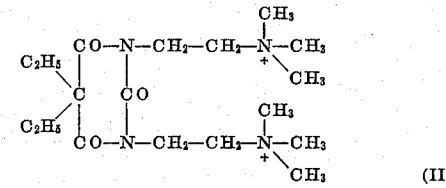

and

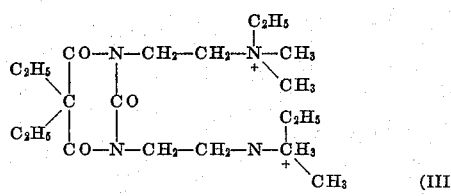

the salts of which are more particularly characterized by therapeutic activity.

The compound I is conveniently prepared, according to the present invention, by reacting 5,5'-diethyl-1-(beta-dimethylaminoethyl)-malonylurea (see "Il Farmaco," vol. IX, No. 11, page 617 of 1954) with beta-dimethylaminoethyl chloride in an alcohol (e. g. methyl, ethyl or propyl alcohol) containing the corresponding sodium alcoholate:

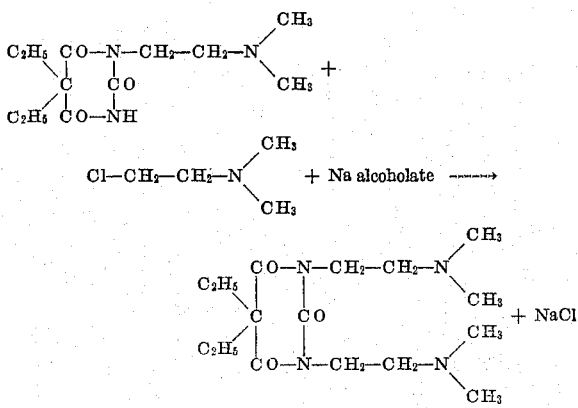

The quaternary ammonium salts according to the invention are conveniently prepared e. g. by treatment of the base (I) in a solvent medium which can be an alcohol (e. g. methyl, ethyl, propyl or butyl alcohol) or an aromatic hydrocarbon (e. g. benzol, toluol, xylol) or chloroform, ethylic ether or the like with the corresponding alkyl halide (e. g. methyl iodide and bromide, ethyl iodide and bromide, etc.), or with the corresponding alkyl sulfate (e. g. dimethylsulfate, ethyl sulphate and the like). The quaternary ammonium salts of the compound I which can be obtained by the process according to this invention, and particularly the iodomethylate and the iodoethylate of the compound I, are characterized by ganglio-plegical activity. They are therefore useful in the treatment f. i. of hypertension and peripheral vascular diseases, as well as for the artificial hibernation and controlled hypotension. The new compounds are advantageously administered either orally or by intravenous or intramuscular injections.

The following examples set forth presently preferred illustrative embodiments of the invention. In these examples, the relationship between parts by weight and parts by volume is the same as that between grams and milliliters.

Example 1

15 parts by weight of 5,5'-diethyl-1-dimethylaminoethyl-malonylurea and 15 parts by weight of beta-dimethylaminoethyl chloride are added to 2.3 parts by weight of sodium dissolved in 50 parts by volume of methyl alcohol. The solution is heated under reflux for 18 hours. The formed sodium chloride is filtered off, and the remaining alcoholic solution is evaporated on a water-bath. The residue is dissolved in absolute alcohol (ethanol). Upon the addition of ether, the desired product—5,5'-diethyl - 1,3-bis - (beta-dimethylaminoethyl)-malonylurea—precipitates. It is then separated by suction (water-jet) filtration. After recrystallization from a small quantity of absolute ethanol, the product exhibits a melting point of 182° C.

Example 2

To 5 parts by weight of 5,5'-diethyl-1,3-bis-(beta-dimethylaminoethyl)-malonylurea, dissolved in 50 parts by volume of absolute ethanol, is added an excess of methyl iodide. The solution is allowed to stand for 48 hours, whereupon the desired product—5,5'-diethyl-1,3-bis-(beta-trimethylaminoethyl) - malonylurea iodide—precipitates. After separation of the said product by suction filtration, it may be recrystallized from absolute ethanol; M. P. 208° C.

Example 3

An excess of ethyl iodide is added to 5 parts by weight of 5,5' - diethyl-1,3-bis(beta-dimethylaminoethyl)-malonylurea in solution in 50 parts by volume of absolute ethanol. The resultant solution is allowed to stand for 3 days, whereupon the desired product—5,5'-diethyl-1,3 - bis(beta-dimethylethylaminoethyl) - malonylurea iodide—precipitates. After collection of the precipitate by suction filtration and recrystallization thereof from absolute ethanol, it exhibits a melting point of 204–206° C.

Having thus disclosed the invention, what is claimed is:

1. A process for the preparation of 5,5'-diethyl-1,3-bis - (beta - trimethylaminoethyl) - malonylurea iodide, which comprises reacting 5,5'-diethyl-1-(beta-dimethylaminoethyl)-malonylurea with beta-dimethylaminoethyl chloride in methyl alcohol containing sodium methylate, separating the resultant sodium chloride, adding an excess of methyl iodide to the remaining alcoholic solution, whereupon the 5,5'-diethyl-1,3-bis-(beta-trimethylaminoethyl)-malonylurea iodide precipitates, and separating the so-precipitated product.

2. A process for the preparation of 5,5'-diethyl-1,3-bis-(beta-dimethylethylaminoethyl)-malonylurea iodide, which comprises reacting 5,5'-diethyl-1-(beta-dimethylaminoethyl)-malonylurea with beta-dimethylaminoethyl chloride in methyl alcohol containing sodium methylate, separating the resultant sodium chloride, adding an excess of ethyl iodide to the remaining alcoholic solution, whereupon the 5,5'-diethyl-1,3-bis-(beta-dimethylethylaminoethyl)-malonylurea iodide precipitates, and separating the so-precipitated product.

3. A process for the preparation of 5,5'-diethyl-1,3-bis-(beta-trimethylaminoethyl)-malonylurea iodide, which comprises adding an excess of methyl iodide, as quaternizing agent, to 5,5'-diethyl-1,3-bis-(beta-dimethylaminoethyl)-malonylurea, whereupon the desired quaternary ammonium salt is precipitated.

4. A process for the preparation of 5,5'-diethyl-1,3-bis-(beta-dimethylethylaminoethyl)-malonylurea iodide, which comprises adding an excess of ethyl iodide, as quaternizing agent, to 5,5'-diethyl-1,3-bis-(beta-dimethylaminoethyl)-malonylurea, whereupon the desired quaternary ammonium salt is precipitated.

References Cited in the file of this patent

Il Farmaco, vol. IX, No. 11, pages 617–625 (1954)